US010414390B2

(12) United States Patent
Morita et al.

(10) Patent No.: US 10,414,390 B2
(45) Date of Patent: Sep. 17, 2019

(54) CONTROL APPARATUS FOR INTERNAL COMBUSTION ENGINE

(71) Applicant: TOYOTA JIDOSHA KABUSHIKI KAISHA, Toyota-shi, Aichi-ken (JP)

(72) Inventors: Yusuke Morita, Susono (JP); Takashi Koyama, Mishima (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 426 days.

(21) Appl. No.: 15/278,614

(22) Filed: Sep. 28, 2016

(65) Prior Publication Data

US 2017/0088113 A1 Mar. 30, 2017

(30) Foreign Application Priority Data

Sep. 30, 2015 (JP) .................. 2015-192471

(51) Int. Cl.
| | |
|---|---|
| *B60W 10/30* | (2006.01) |
| *B60W 10/06* | (2006.01) |
| *F01M 1/02* | (2006.01) |
| *F01P 5/12* | (2006.01) |
| *F02D 41/12* | (2006.01) |
| *F02D 41/22* | (2006.01) |

(Continued)

(52) U.S. Cl.
CPC ............ *B60W 10/30* (2013.01); *B60W 10/06* (2013.01); *F01M 1/02* (2013.01); *F01M 1/16* (2013.01); *F01P 5/12* (2013.01); *F02D 41/12* (2013.01); *F02D 41/22* (2013.01); *B60W 2510/30* (2013.01); *B60W 2710/0666* (2013.01); *B60W 2710/30* (2013.01); *F01M 2001/0207* (2013.01); *F01M 2001/0215* (2013.01); *F01M 2001/0253* (2013.01); *F16H 1/04* (2013.01)

(58) Field of Classification Search
USPC ...................................... 123/196, 90.33, 395
See application file for complete search history.

(56) References Cited

U.S. PATENT DOCUMENTS

| | | | | |
|---|---|---|---|---|
| 1,167,509 | A | * | 1/1916 | Macdonald ............... F01P 5/10 |
| | | | | 123/179.28 |
| 4,156,407 | A | * | 5/1979 | Moll ....................... F01M 5/00 |
| | | | | 123/196 AB |

(Continued)

FOREIGN PATENT DOCUMENTS

| | | | |
|---|---|---|---|
| JP | 55087828 A | * | 7/1980 |
| JP | 2003-336513 A | | 11/2003 |

(Continued)

*Primary Examiner* — Sizo B Vilakazi
*Assistant Examiner* — Brian R Kirby
(74) *Attorney, Agent, or Firm* — Hunton Andrews Kurth LLP

(57) ABSTRACT

A control apparatus is applied to an internal combustion engine. The engine comprises a water pump, and an oil pump. The apparatus makes a second motor to drive the water pump drive the oil pump, if the first motor to drive the oil pump malfunctions. Consequently, if the first motor malfunctions, the oil pump can be driven by the second motor. Thus, the possibility of seizing of the sliding portions of the engine can be reduced. Further, if the first motor malfunctions, the friction in the engine can be reduced, since the oil pump is not driven by the crank shaft.

8 Claims, 9 Drawing Sheets

(51) Int. Cl.
*F01M 1/16* (2006.01)
*F16H 1/04* (2006.01)

(56) References Cited

U.S. PATENT DOCUMENTS

| | | | | |
|---|---|---|---|---|
| 4,913,108 | A * | 4/1990 | Sougawa | F01M 3/00 |
| | | | | 123/196 S |
| 5,765,521 | A * | 6/1998 | Stutzle | F01M 1/12 |
| | | | | 123/196 S |
| 6,048,288 | A * | 4/2000 | Tsujii | B60H 1/3222 |
| | | | | 477/5 |
| 6,524,218 | B1 * | 2/2003 | Yamada | B60K 6/48 |
| | | | | 477/5 |
| 6,878,092 | B1 * | 4/2005 | Schustek | B60H 1/3222 |
| | | | | 477/3 |
| 7,543,695 | B2 * | 6/2009 | Redelman | F16H 57/04 |
| | | | | 180/9.1 |
| 7,951,043 | B2 * | 5/2011 | Reisch | F16H 57/0434 |
| | | | | 192/113.3 |
| 8,157,686 | B2 * | 4/2012 | Boutou | B60K 6/365 |
| | | | | 475/5 |
| 9,027,727 | B2 * | 5/2015 | Danford | F16D 27/00 |
| | | | | 192/90 |
| 2003/0230274 | A1 | 12/2003 | Williams et al. | |
| 2005/0103286 | A1 * | 5/2005 | Ji | F01P 5/10 |
| | | | | 123/41.44 |
| 2006/0053785 | A1 * | 3/2006 | Mori | B60K 8/00 |
| | | | | 60/520 |
| 2009/0011886 | A1 * | 1/2009 | Schondelmaier | F16H 57/0434 |
| | | | | 475/5 |
| 2009/0026000 | A1 * | 1/2009 | Nakamura | B60K 5/04 |
| | | | | 180/291 |
| 2009/0232673 | A1 * | 9/2009 | Reisch | F16H 57/0434 |
| | | | | 417/364 |
| 2011/0124459 | A1 * | 5/2011 | Shimizu | F16H 57/0436 |
| | | | | 475/137 |
| 2012/0129651 | A1 * | 5/2012 | Erjawetz | B60K 25/00 |
| | | | | 477/5 |
| 2012/0317967 | A1 * | 12/2012 | Donohue | B60K 6/12 |
| | | | | 60/423 |
| 2013/0323095 | A1 * | 12/2013 | Tazume | F04B 17/03 |
| | | | | 417/364 |
| 2014/0018206 | A1 * | 1/2014 | Bernhardt | B60W 20/40 |
| | | | | 477/5 |

FOREIGN PATENT DOCUMENTS

| | | |
|---|---|---|
| JP | 2004-285974 A | 10/2004 |
| JP | 2008-274909 A | 11/2008 |
| JP | 2008274909 A * | 11/2008 |
| JP | 2012-145075 A | 8/2012 |
| JP | 2014-231775 A | 12/2014 |

* cited by examiner

CONTROL APPARATUS FOR INTERNAL COMBUSTION ENGINE

CROSS-REFERENCE TO RELATED APPLICATION

The present application claims priority to Japanese Patent Application No. 2015-192471 filed on Sep. 30, 2015, which is incorporated herein by reference in its entirety.

BACKGROUND OF THE INVENTION

1. Field of the Invention

Embodiments of the present invention relate to a control apparatus for an internal combustion engine comprising a motor which drives a water pump, and a motor which drives an oil pump.

2. Description of the Related Art

Conventionally, an oil pump is used as a device for feeding a lubrication oil (engine oil) into an oil passage (oil path) formed in an internal combustion engine. Generally, the oil pump is driven by a crankshaft. Such an oil pump is referred to as a "mechanical oil pump." On the other hand, an oil pump is known which is driven by a motor such as a DC motor. Such an oil pump is referred to as an "electric motor driven oil pump."

The electric motor driven oil pump does not need a structure which connects the crankshaft with the oil pump, unlike the mechanical oil pump. Therefore, the electric motor driven oil pump can reduce friction in the engine. On the other hand, however, the electric motor driven oil pump cannot feed the lubrication oil to the oil passage if it is malfunctioning, and thus, the sliding portions of the internal combustion engine may seize.

An apparatus (hereinafter, referred to as a "conventional apparatus") disclosed in Japanese Laid Open Patent Application No. 2004-285974 (especially, claim 7, and paragraph 0031) is applied to an internal combustion engine comprising a mechanical oil pump and an electric motor driven oil pump, and is configured to have the mechanical oil pump operate when the electric motor driven oil pump malfunctions.

According to the conventional apparatus, the lubrication oil can be fed to the oil passage even when the electric motor driven oil pump malfunctions. As a result, seizing of the sliding portions of the internal combustion engine may be avoided, when the electric motor driven oil pump malfunctions.

SUMMARY

According to the conventional apparatus, when the electric motor driven oil pump malfunctions, seizing of the sliding portions of the internal combustion engine may be avoided, however, the engine friction increases because the mechanical pump is driven.

Embodiments of the present invention are made to solve the problem described above. That is, one of the objects of embodiments of the present invention is to provide a control apparatus for an internal combustion engine (hereinafter, referred to as a "present control apparatus"), that is applied to the internal combustion engine including an electric motor driven oil pump, and that can reduce the possibility that the sliding portions of the internal combustion engine seize without increasing the engine friction, if the electric motor driven oil pump malfunctions.

The present control apparatus is applied to an internal combustion engine in which lubrication is performed using a lubrication oil discharged from an oil pump, and cooling is performed using a coolant discharged from a water pump. The internal combustion engine includes a first motor to drive the oil pump, a second motor to drive the water pump, and a first change over mechanism.

The first change over mechanism is configured to change a state between (or achieve one of) a first state and a second state, the first state being a state in which the second motor cannot drive the oil pump, and the second state being a state in which the second motor can drive the oil pump (in other words, it is configured to selectively realize either one of the first state or the second state).

Further, the present control apparatus comprises malfunction determination means, and control means.

The malfunction determination means is configured to determine whether or not the first motor malfunctions.

The control means is configured to realize/achieve the first state using the first change over mechanism if it is not determined that the first motor malfunctions, and to realize/achieve the second state using the first change over mechanism if it is determined that the first motor malfunctions.

According to the configurations described above, if it is determined that the first motor malfunctions, the oil pump is driven by the second motor for driving the water pump. Thus, if the first motor malfunctions, the oil pump is not driven by the crank shaft, however, the lubrication oil can be fed to an oil passage (oil path) formed in the internal combustion engine. Thus, the possibility of seizing of the sliding portions of the internal combustion engine can be reduced, without increasing the friction.

If the first motor malfunctions, it is necessary to increase an output power of the second motor, since the second motor drives not only the water pump but also the oil pump.

In view of the above, in one embodiment of the present control apparatus, the control means is configured to perform at least one of a "torque limiting control" to limit a torque generated by the internal combustion engine to a threshold torque or smaller and a "speed limiting control" to limit an engine rotational speed of the internal combustion engine to a threshold rotational speed or lower, if it is determined that the first motor malfunctions.

According to the embodiment described above, if it is determined that the first motor malfunctions, the torque of the internal combustion engine becomes small and/or the engine rotational speed becomes low, and thereby, it is not necessary to have the pressure of the lubrication oil fed to the oil path be as high as one required if the engine is operated normally (i.e., if the first motor does not malfunction). Consequently, since a power required to drive the oil pump becomes small, the output power of the second motor can be lower, as compared with an example in which the neither the "torque limiting control" nor the "speed limiting control" is performed. Accordingly, a motor whose maximum power is relatively large is not needed, and thus, the cost for the apparatus as a whole can be reduced.

In one embodiment of the present control apparatus, the first change over mechanism is a clutch mechanism (referred to as a "first clutch mechanism", as a matter of convenience). The first clutch mechanism is configured to disconnect the rotating shaft of the oil pump from the output shaft of the second motor in such a manner that no power can be transmitted therebetween so as to realize the first state, and to connect the rotating shaft of the oil pump with the output shaft of the second motor in such a manner that power can be transmitted therebetween so as to realize the second state. This can provide a simple configuration to realize the first state and the second state.

Alternatively, the first change over mechanism may be a gear mechanism. The gear mechanism may be configured to achieve a state in which a first gear which rotates integrally with the output shaft of the first motor and a second gear which rotates integrally with the output shaft of the second motor neither directly nor indirectly mesh with each other, so as to realize the first state, and may be configured to achieve a state in which the first gear and the second gear directly or indirectly mesh with each other, so as to realize the second state. Having the first gear and the second gear directly mesh with each other means having those gears mesh with each other in such a manner the first gear and the second gear directly contact with each other. Having the first gear and the second gear indirectly mesh with each other means having those gears mesh with each other through another gear(s). This embodiment can also provide a simple configuration to realize the first state and the second state.

In the above embodiment, the number of teeth of said first gear and the number of teeth of said second gear may be different from each other.

Using the above configuration, the torque and/or the rotational speed required for the second motor to drive the oil pump can be adjusted to become an appropriate value. In other words, the degree of freedom in selecting the second motor can be enhanced. Further, a relatively low cost motor can be adopted as the second motor, and thus, the cost for the apparatus as a whole can be reduced.

Furthermore, in one embodiment of the present control apparatus, the control means is configured to have the output power of the second motor be larger than an output power required for the second motor to drive the water pump only, when it is determined that the first motor malfunctions.

The embodiment described above increases the output power of the second motor, and thus, the lubrication oil can sufficiently be circulated through the oil path, if the first motor malfunctions.

If the lubrication oil is not supplied to the internal combustion engine, seizing of the sliding portions of the internal combustion engine may occur in a short time, and thus, the engine may become unable to be operated. In contrast, the internal combustion engine can continue to be operated even if the coolant is not supplied to the internal combustion, for a short time. Accordingly, the internal combustion engine can continue to be operated for a longer time, by supplying the lubrication oil more preferentially than supplying the coolant.

In view of the above, in one embodiment of the present control apparatus, the internal combustion engine is configured to further comprise a second change over mechanism. The second change over mechanism is configured to change its state between a third state and a fourth state, the third state being a state in which the second motor can drive the water pump, and the fourth state being a state in which the second motor cannot drive the water pump. In other words, the second change over mechanism is configured to selectively realize either one of the third state or the fourth state.

In addition, in the embodiment above, the control means is configured to realize the third state using the second change over mechanism if it is not determined that the first motor malfunctions, and to realize the fourth state using the second change over mechanism if it is determined that the first motor malfunctions.

According to the above embodiment, if the oil pump is driven by the second motor, the second motor does not drive the water pump. Thus, as compared to an example in which the second motor drives both the oil pump and the water pump, the output power of the second motor need not be large. As a result, a motor whose maximum power is relatively small can be adopted as the second motor, and thus, the inexpensive second motor may be used. Consequently, the cost for the apparatus as a whole can be reduced.

Further, the second change over mechanism may be a second clutch mechanism. The second clutch mechanism may be configured to connect the output shaft of the second motor with the rotating shaft of the water pump in such a manner that power can be transmitted therebetween so as to realize the third state, and be configured to disconnect the output shaft of the second motor from the rotating shaft of the water pump in such a manner that no power can be transmitted therebetween so as to realize the fourth state. This embodiment can provide a simple configuration to realize the third state and the fourth state.

Alternatively, the second change over mechanism may be a second gear mechanism. The second gear mechanism may be configured to achieve a state in which a third gear which rotates integrally with the rotating shaft of the water pump and a fourth gear which rotates integrally with the output shaft of the second motor directly or indirectly mesh with each other, so as to realize the third state, and be configured to achieve a state in which the third gear and the fourth gear neither directly nor indirectly mesh with each other, so as to realize the fourth state. Having the third gear and the fourth gear directly mesh with each other means having those gears mesh with each other in such a manner the third gear and the fourth gear directly contact with each other. Having the third gear and the fourth gear indirectly mesh with each other means having those gears mesh with each other through another gear(s). This embodiment can also provide a simple configuration to realize the third state and the fourth state.

Other objects, other features, and accompanying advantages of embodiments of the present invention will be readily understood from the description of embodiments to be given, referring to the following drawings.

DETAILED DESCRIPTION OF EMBODIMENTS

Each of the following embodiments of a control apparatus for an internal combustion engine (hereinafter, referred to as a "present control apparatus") is described with reference to the drawings. Note that, in the following explanation, similar component elements are assigned the same reference notations.

First Embodiment (Structure)

Figure 1:
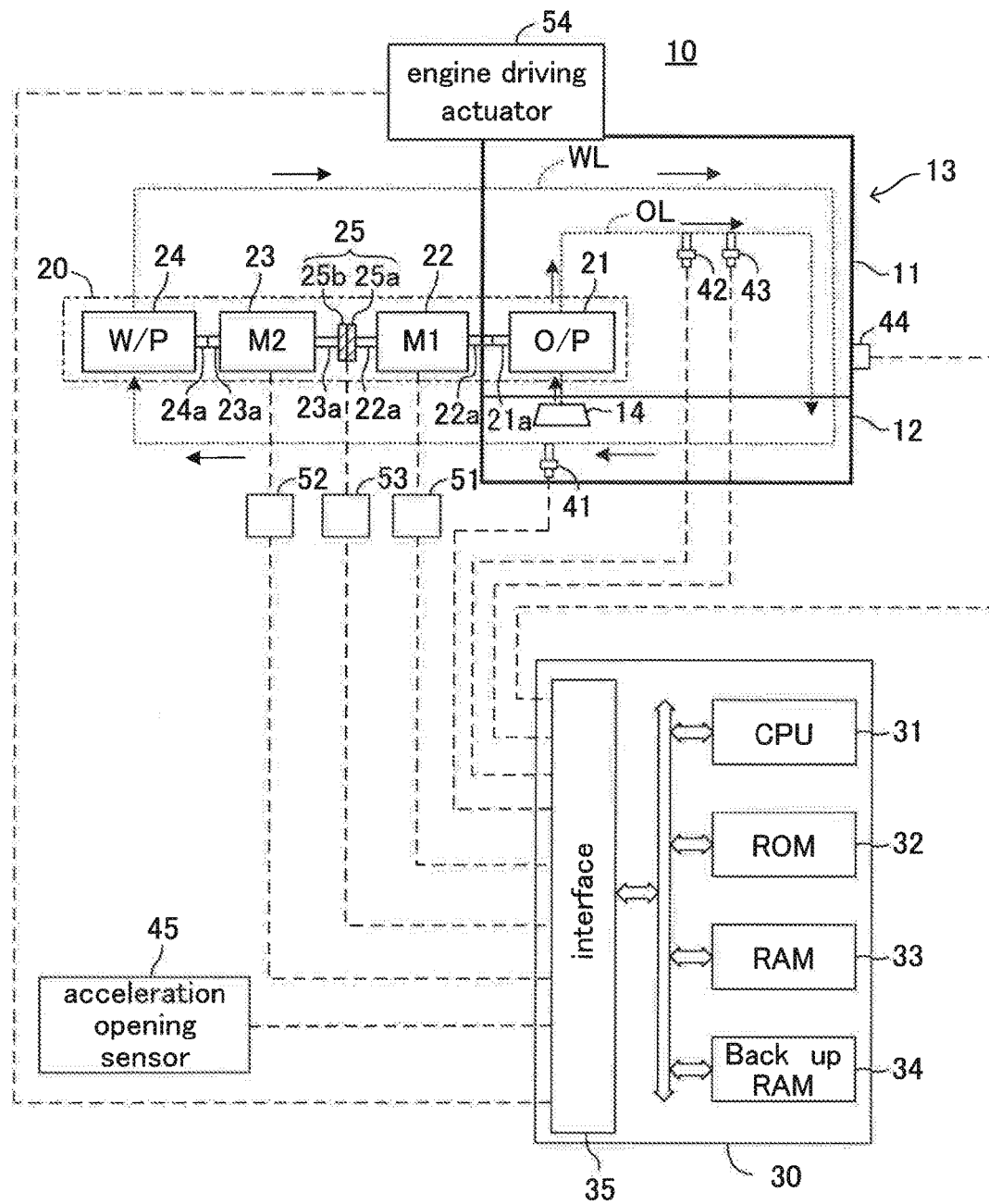
FIG. 1 is a schematic diagram of an internal combustion engine to which a control apparatus (first apparatus) for an internal combustion engine according to a first embodiment of the present invention is applied.

The control apparatus for an internal combustion engine (hereinafter, simply referred to as a "first apparatus") according to the first embodiment of the present invention is applied to an internal combustion engine (hereinafter, referred to as an "engine") 10 shown in FIG. 1.

The engine 10 is a reciprocating piston type engine, and comprises a main body portion 11 including a cylinder head, a cylinder block, a lower case for the cylinder block, and an oil pan 12. Unillustrated cylinders are formed in the main body portion 11. An unillustrated piston is accommodated in the cylinder, and is connected to an unillustrated crankshaft. The oil pan 12 is fixed to the lower side of the main body portion 11, and stores a lubrication oil (engine oil) for lubrication of machinery. The main body portion 11 and the oil pan 12 constitute an "engine main body 13."

The engine 10 comprises a pump device 20. The pump device 20 includes an oil pump 21, a first motor 22, a second motor 23, a water pump 24, and an electromagnetic clutch (first electromagnetic clutch) 25.

The oil pump 21 is positioned in the engine main body 13. The oil pump 21 is driven (rotated) by the first motor 22 to feed/discharge the lubrication oil stored in the oil pan 12 to the oil path (oil passage) OL through a strainer 14. As is well known, the oil path OL is a path which passes through sections in the vicinity of portions that require lubrication in the engine 10 so as to provide the lubrication oil to the portions, and which returns the surplus lubrication oil to the oil pan 12. A part of the lubrication oil is directly returned to the oil pan 12 after it is provided to portions which require lubrication in the engine 10 through a part of the oil path OL. The oil pump 21 comprises a rotating shaft (driven shaft) 21a. When the rotating shaft 21a rotates, the lubrication oil is sucked through a suction opening, and is fed (transferred) into the oil path OL. The rotating shaft 21a extends toward a side portion of the engine main body 13.

The first motor 22 is positioned at the outside of the engine main body 13 and in the vicinity of the engine main body 13 (so as to be next to the engine main body 13). The first motor 22 is driven (rotated) when energized (when an electric power is supplied) in accordance with an instruction from an electric control unit 30 described later. An output shaft (rotating shaft) 22a of the first motor 22 extends so as to penetrate through a main body of the first motor 22. The first motor 22 is arranged/positioned in such a manner that the output shaft 22a is coaxial with the rotating shaft 21a. One end (right hand end in FIG. 1) of the output shaft 22a is connected with an end (left hand end shown in FIG. 1) of the rotating shaft 21a. Accordingly, the first motor can rotate/drive the oil pump 21.

The second motor 23 is positioned at the outside of the engine main body 13 so as to be next to the first motor 22. The second motor 23 is driven (rotated) when energized (when an electric power is supplied) in accordance with an instruction from the electric control unit 30 described later. An output shaft (rotating shaft) 23a of the second motor 23 extends so as to penetrate through a main body of the second motor 23. The second motor 23 is arranged/positioned in such a manner that the output shaft 23a is coaxial with the output shaft 22a.

The water pump 24 is positioned at the outside of the engine main body 13, and at a side opposite to the first motor with respect to the second motor, so as to be next to the second motor 23. The water pump 24 is driven (rotated) by the second motor 23 to feed/discharge the coolant into a coolant passage WL. As is well known, the coolant passage WL extends from the water pump 24, passes through portions in the vicinity of portions that require cooling in the engine 10, thereafter, passes through an unillustrated radiator, and returns to the water pump 24. The water pump 24 comprises a rotating shaft (driven shaft) 24a. When the rotating shaft 24a rotates, the coolant is sucked from/through a suction opening, and is fed (transferred) into the coolant passage WL from a discharge opening. The water pump 24 is positioned/arranged in such a manner that the rotating shaft 24a is coaxial with the output shaft 23a. One end (right hand end in FIG. 1) of the rotating shaft 24a is connected with one end (left hand end shown in FIG. 1) of the output shaft 23a. Accordingly, the second motor can rotate/drive the water pump 24. When the water pump 24 is driven, the coolant circulates through the coolant passages WL.

The electromagnetic clutch 25 is positioned between the other end (left side end shown in FIG. 1) of the output shaft 22a of the first motor and the other end (right side end shown in FIG. 1) of the output shaft 23a of the second motor 23. The output shaft 23a of the second motor 23 extends towards the output shaft 22a of the first motor 22. The electromagnetic clutch 25 comprises a first friction plate 25a connected to the output shaft 22a, a second friction plate 25b connected to the output shaft 23a, and an unillustrated electromagnetic actuator. The electromagnetic clutch 25 can transfer a rotating torque (driving force) generated at the output shaft 23a of the second motor 23 to the output shaft 22a of the first motor 22, when the first friction plate 25a and the second friction plate 25b are engaged with each other (that is, when the electromagnetic clutch 25 functions/operates, or is in the connecting state). This state is referred to as a "power-transmitting state", or as a "second state", as a matter of convenience. Further, the electromagnetic clutch 25 cannot transfer the rotating torque (driving force) generated at the output shaft 23a of the second motor 23 to the output shaft 22a of the first motor 22, if the first friction plate 25a and the second friction plate 25b are apart from (or not engaged with) each other (that is, if the electromagnetic clutch 25 does not function/operate, or is in the non-connecting state). This state is referred to as a "non-power-transmitting state", or as a "first state", as a matter of convenience. The electromagnetic clutch 25 operates the unillustrated electromagnetic actuator in accordance with a control signal from the electric control unit 30 so as to selectively realize one of the power-transmitting state and the non-power-transmitting state.

The first apparatus comprises, e.g., the electric control unit 30, a coolant temperature sensor 41, an oil temperature sensor 42, an oil pressure sensor 43, a crank position sensor 44, and an acceleration opening sensor 45. Further, the first apparatus comprises a first driving circuit 51, a second driving circuit 52, a clutch driving circuit 53, and an engine driving actuator 54.

The electric control unit (controller) 30 is a well-known micro-computer comprising a CPU 31, a ROM 32, a RAM 33, a back-up RAM 34, and an interface 35 including an AD converter. The interface 35 is connected with those sensors 40-45, and provides signals from those sensors to the CPU 31. Further, the interface 35 sends control signals to the first driving circuit 51, the second driving circuit 52, the clutch driving circuit 53, and the engine driving actuator 54.

The coolant temperature sensor 41 detects a temperature of the coolant of the engine 10 (coolant in a coolant passage WL) so as to output a signal indicative of a coolant temperature THW.

The oil temperature sensor 42 detects a temperature of the lubrication oil of the engine 10 (engine oil in an oil path OL) so as to output a signal indicative of a lubrication oil temperature TOIL.

The oil pressure sensor 43 detects a pressure of the lubrication oil of the engine (lubrication oil at a certain portion in the oil path OL, for example, lubrication oil in the oil path OL passing through the cylinder head), so as to output a signal indicative of a lubrication oil pressure (oil pressure) POIL.

The crank position sensor 44 outputs a pulse signal every time the crank shaft rotates by 10 degrees. The pulse signal output from the crank position sensor 44 is converted into an engine rotational speed NE by the electric control unit 30.

The acceleration opening sensor 45 detects an operation amount of an unillustrated acceleration pedal operated by a driver, so as to output a signal indicative of an operation amount Accp of the acceleration pedal. The operation amount Accp of the acceleration pedal is one of parameters indicative of a load of the engine 10.

The first driving circuit 51 supplies an electric power with the first motor 22 so as to control an operation of the first motor 22 in response to the signal from the electric control unit 30.

The second driving circuit 52 supplies an electric power with the second motor 23 so as to control an operation of the second motor 23 in response to the signal from the electric control unit 30.

The clutch driving circuit 53 controls an operation of the first electromagnetic actuator of the electromagnetic clutch 25 in response to the signal from the electric control unit 30.

The engine driving actuator 54 includes, e.g., fuel injectors, ignition devices, and a throttle valve actuator. The engine driving actuator 54 operates in response to the signal from the electric control unit 30, so as to change the output torque of the engine and the engine rotational speed.

(Outline of Switch Over Control)

The outline of the switch over control that the first apparatus performs will next be described. The first apparatus, usually (i.e., when it is not determined that the first motor 22 malfunctions), drives the oil pump 21 using the first motor 22, and drives the water pump 24 using the second motor. The first apparatus, if it is determined that the first motor 22 malfunctions (i.e., if it is determined that the malfunction of the first motor 22 has occurred), drives both the water pump 24 and the oil pump 21 using the second motor 23.

Figure 2:
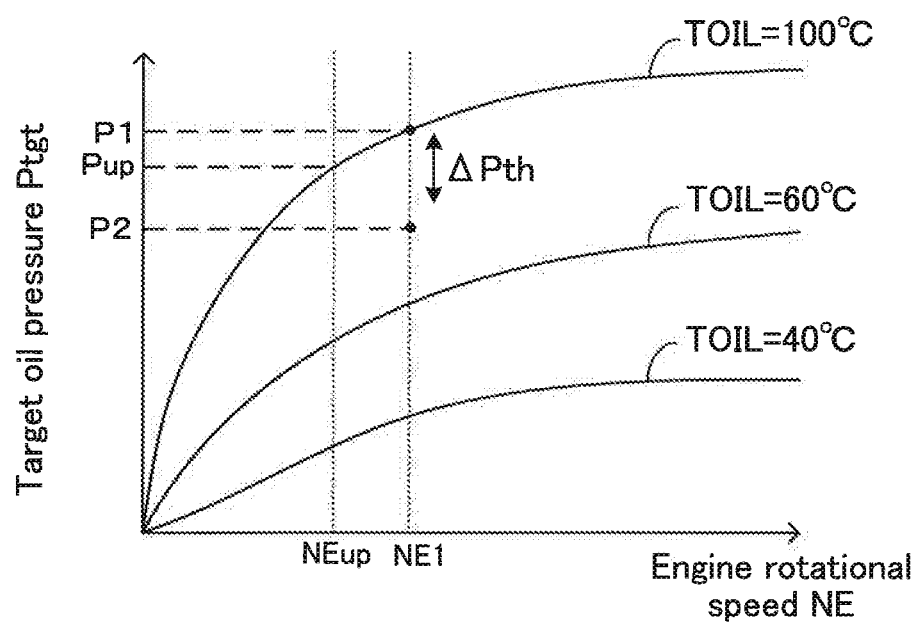
FIG. 2 is a graph showing a relationship among an engine rotational speed, an oil temperature, and a target oil pressure.

The first apparatus obtains a target oil pressure Ptgt by applying the oil temperature TOIL obtained by the oil temperature sensor 42 and the engine rotational speed NE obtained using the crank position sensor 44 to a "relationship among the oil pressure TOIL, the engine rotational speed NE, and the target oil pressure Ptgt" shown in FIG. 2. The relationship is stored in the ROM 32 in the form of a look-up table. According to the relationship shown in FIG. 2, the target oil pressure Ptgt becomes higher as the engine rotational speed becomes higher, and the target oil pressure Ptgt becomes higher as the oil temperature becomes higher. Under the normal state, the first apparatus performs a feedforward control to control the first motor 22 so that the actual oil pressure becomes equal to the target oil pressure Ptgt. In other words, the first apparatus stores in the ROM 32 an "instruction amount (that determines the torque and the rotational speed of the first motor 23) to be provided to the first motor 33" with respect to a combination of the engine rotational speed NE and the oil temperature TOIL, and reads out the instruction amount from the ROM 32 to send it to the first driving circuit 51. The first driving circuit 51 supplies the electric power with the second motor 22 in such a manner that the first motor 22 rotates in accordance with the instruction amount.

On the other hand, if the actual oil pressure POIL detected by the oil pressure sensor 43 is smaller than the target oil pressure Ptgt by a predetermined threshold $\Delta$Pth or more, the first apparatus determines that the first motor 22 is malfunctioning. For example, if the oil temperature is 100° C. and the engine rotational speed NE is NE1, the target oil pressure Ptgt is the oil pressure P1 shown in FIG. 2, however, if the detected oil pressure POIL is the "oil pressure P2 which is smaller than the oil pressure P1 by the predetermined threshold $\Delta$Pth or more", the first apparatus determines that the first motor 22 malfunctions.

If the first apparatus determines that the first motor 22 malfunctions, the first apparatus changes (switches over) the driving source of the oil pump 21 from the first motor 22 to the second motor 23, so as to drive the oil pump 21 using the second motor 23. More specifically, if it is determined that the first motor 22 malfunctions, the first apparatus changes the state of the electromagnetic clutch 25 which has been in the non-connecting state into the connecting state so as to connect the output shaft 22a of the first motor 22 with the output shaft 23a of the second motor 23. Consequently, the second motor 23 and the first motor 22 are in the power transmitting state. Further, the first apparatus stops the energization of the first motor 22 (stops supplying the power with the first motor 22), and drives the second motor 23. As a result, the oil pump 21 is driven by the second motor 23, so that the lubrication for the engine 10 continues to be performed. If this occurs, the water pump 24 is driven by the second motor 23 so that the cooling of the engine 10 continues to be performed.

If the first apparatus drives the oil pump 21 using the second motor 23, the first apparatus sets/controls the output power of the second motor 23 in such a manner that the output power (torque) of the second motor 23 becomes equal to an "output power obtained by summing an output power required for the oil pump 21 and an output power required for the water pump 24." That is, if it is determined that the first motor 22 malfunctions, the first apparatus makes the second motor 23 generate an output power larger than an output power that the second motor 23 generates if it is not determined that the first motor 22 malfunctions (namely, larger than an output power required for the second motor 23 to drive the water pump 24 only).

Accordingly, if the first motor 22 malfunctions, the lubrication oil can be fed to the oil path OL by/with the oil pump 21 which is driven by the second motor 23. As a result, the possibility that the sliding portions of the engine 10 seize can be reduced. Further, the oil pump 21 is driven by the first motor 22 which does not need the crank shaft as the driving source if the first motor 22 is normal, and the oil pump 21 is driven by the second motor 23 which does not need the crank shaft as the driving source if the first motor 22 malfunctions. Thus, regardless of whether or not the first motor 22 malfunctions, the friction in the engine 10 can be reduced, since the oil pump 21 is never driven by the crank shaft.

In addition, if it is determined that the first motor 22 malfunctions, the first apparatus increases the output power of the second motor 23 so as to drive the water pump 24 and the oil pump 21. Accordingly, even if the first motor 22 malfunctions, the coolant can be sufficiently circulated through the coolant passage WL, and the lubrication oil can be sufficiently circulated through the oil path OL (Actual Operation of the First Apparatus)

The actual operation of the first apparatus will next be described.

The CPU 31 (hereinafter, simply referred to as a "CPU") of the electric control unit 30 of the first apparatus executes a motor control routine shown by a flowchart in FIG. 3 every elapse of a predetermined time period after a start of the engine 10. Therefore, at an appropriate point in time, the CPU starts processing from step 300 to proceed to step 310, at which it determines whether or not the present point in time is a time of the start of the engine 10. That is, the CPU determines whether or not the present point in time is immediately after a "point in time at which a position of an ignition key switch (not shown) of a vehicle on which the engine 10 is mounted is changed from an off position to an on position.

If the present point in time is the start of the engine 10, the CPU makes a "Yes" determination at step 310 to proceed to step 320, at which the CPU sets the electromagnetic clutch 25 at the non-connecting state. Thereafter, the CPU executes processes of step 330 and step 340 described below, and proceeds to step 395 so as to end the present routine tentatively.

Step 330: The CPU determines a first motor target output power W1 by applying the actual oil temperature TOIL and the actual engine rotational speed NE to a look up table MapW1(TOIL, NE) stored in the ROM 32, and controls the first motor 22 (the first driving circuit 51) in such a manner that the first motor 22 generates an output power equal to the first motor target output power W1. According to the table MapW1(TOIL, NE), the first motor target output power W1 is determined to be larger as the oil temperature TOIL is higher, and to be larger as the engine rotational speed NE is higher. If the first motor 22 does not malfunction, and the the first motor 22 outputs the output power equal to the first motor target output power W1, the oil pressure POIL substantially becomes equal to the target oil pressure Ptgt shown in FIG. 2.

Step 340: The CPU determines a second motor target output power W2 by applying the actual coolant temperature THW to a look up table MapW2(THW) stored in the ROM 32. According to the table MapW2(THW), the second motor target output power W2 is determined to be larger as the coolant temperature THW is higher. The CPU controls the second motor 23 (the second driving circuit 52) in such a manner that the second motor 23 generates an output power equal to the second motor target output power W2.

Subsequently, as the CPU proceeds to step 310, the CPU makes a "No" determination at step 310 to proceed to step 350, at which the CPU determines whether or not a constant time t1 has passed since the engine 10 was started. The constant time t1 is set at a time required for the oil pressure POIL to become sufficiently high after the first motor 22 was started to be driven. If the constant time t1 has not passed since the engine 10 was started, the CPU makes a "No" determination at step 350 to execute the processes of step 330 and step 340 described above.

If the CPU starts the process from step 300 after a point in time at which the constant time t1 has passed since the engine 10 was started, the CPU makes a "No" determination at step 310, and makes a "Yes" determination at step 350. Thereafter, the CPU proceed to step 360 to determine whether or not the first motor 22 malfunctions.

More specifically, as described above, the CPU determines/obtains the target pressure Ptgt by applying the oil temperature TOIL and the engine rotational speed NE to the look up table shown in FIG. 2. Further, the CPU determines that the first motor 22 malfunctions when the oil pressure POIL is smaller than the target oil pressure Ptgt by the predetermined threshold value ΔPth or more (POIL<Ptgt−ΔPth). If the CPU does not determine that the first motor 22 malfunctions, it makes a "No" determination at step 360 to execute the processes of step 330 and step 340 described above.

In contrast, if the CPU determines that the first motor 22 malfunctions, it makes a "Yes" determination at step 360 to execute processes of step 370 to step 390 described below in this order, and proceeds to step 395 to end the present routine tentatively.

Step 370: The CPU sets the electromagnetic clutch 25 at the connecting state. That is, the CPU sends an instruction signal to the clutch driving circuit 53 so as to change/switch over the state of the electromagnetic clutch 25 from the "non-connecting state that is the non-power-transmitting state" to the "connecting state that is the power-transmitting state."

Step 380: The CPU sets the target output power W1 of the first motor 22 at "0" so as to stop driving the first motor 22.

Step 390: The CPU sets the target output power W2 of the second motor 23 at a value equal to a sum of the output power determined based on the look up table MapW1(TOIL, NE) and the output power determined based on the look up table MapW2(THW). That is, the CPU sets the target output power W2 of the second motor 23 in such a manner that the target output power W2 becomes equal to a required output power obtained by adding the output power required for driving the oil pump 21 to the output power required for driving the water pump 24. The CPU controls the second motor 23 (second driving circuit 52) in such a manner that the second motor 23 generates the output power equal to the target output power W2.

As described above, the internal combustion engine 10 comprises:

the first motor 22 which drives the oil pump 21;

the second motor 23 which drives the water pump 24; and first change over (switch over) mechanism 25 which can selectively realize either one of the "first state (non-power transmitting state, non-connecting state) in which the second motor 23 cannot drive the oil pump 21" and the "second state (power transmitting state, connecting state) in which the second motor 23 can drive the oil pump 21." That is, the first change over mechanism 25 can perform a switchover between the first state and the second state.

In addition, the first apparatus comprises:

malfunction detecting means (step 360) for determining whether or not the first motor 22 malfunctions; and control means for achieving the first state using the first change over mechanism 25 if it is not determined that the first motor 22 malfunctions (step 320), and achieving the second state using the first change over mechanism 25 if it is determined that the first motor 22 malfunctions (step 370).

Further, the first change over mechanism 25 is a clutch (clutch mechanism) 25 which disconnects the rotating shaft 21a of the oil pump 21 from the output shaft 23a of the second motor 23 in such a manner that no power can be transmitted therebetween so as to realize the first state (non-power transmitting state, non-connecting state), and connects the rotating shaft 21a of the oil pump 21 with the output shaft 23a of the second motor 23 in such a manner that power can be transmitted therebetween so as to realize the second state (power transmitting state, connecting state).

According to the first apparatus, if the first motor 22 malfunctions, the oil pump 21 is driven by the second motor 23. Therefore, the oil can be fed to the oil path OL, even if the first motor 22 malfunctions. Consequently, the possibility of occurrence of the seizing of the sliding portions of the engine 10 can be reduced. Further, since the oil pump 21 is driven by the second motor 23 which does not use the crank shaft as its driving source, increasing of the friction in the engine 10 can be avoided.

Furthermore, the first apparatus sets the output power of the second motor 23 at the required output power obtained by adding the output power required for driving the oil pump 21 to the output power required for driving the water pump 24, when the second motor 23 drives the oil pump 21 (refer to step 330, step 340, and step 390). As a result, the coolant can be sufficiently circulated through the coolant passage WL, and the lubrication oil can be sufficiently circulated through the oil path OL, even if the first motor 22 malfunctions.

In addition, the control means (30) of the first apparatus is configured to perform a second-motor-output-power-increasing-control to set the output power of the second motor 23 at a power which is larger than the output power W2 required for the second motor 23 to drive the water pump 24 by a predetermined output power W1, if it is determined that the first motor 22 malfunctions (step 390). That is, if it is determined that the first motor 22 malfunctions, the control means (30) makes the output power of the second motor 23 be larger than the output power required for the second motor 23 to drive the water pump 24 only.

According to the configuration above, if it is determined that the first motor 22 malfunctions, the output power of the second motor 23 is increased. Thus, the oil pressure in the oil path OL is maintained high so as to sufficiently circulate the lubrication oil through the oil path OL.

Modified Embodiment of the First Embodiment

Figure 3:
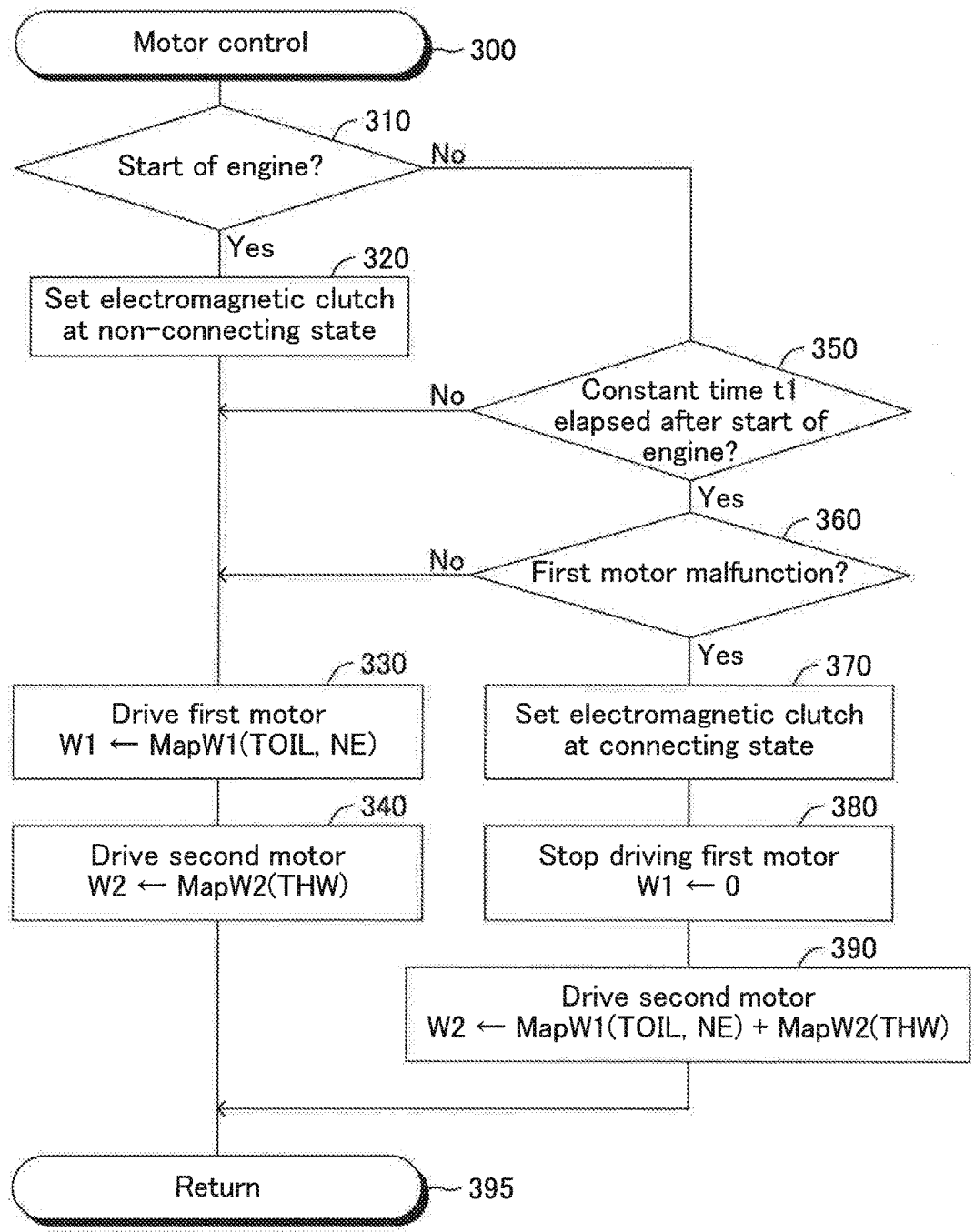
FIG. 3 is a flowchart showing a routine executed by a CPU of the first apparatus.
Figure 4:
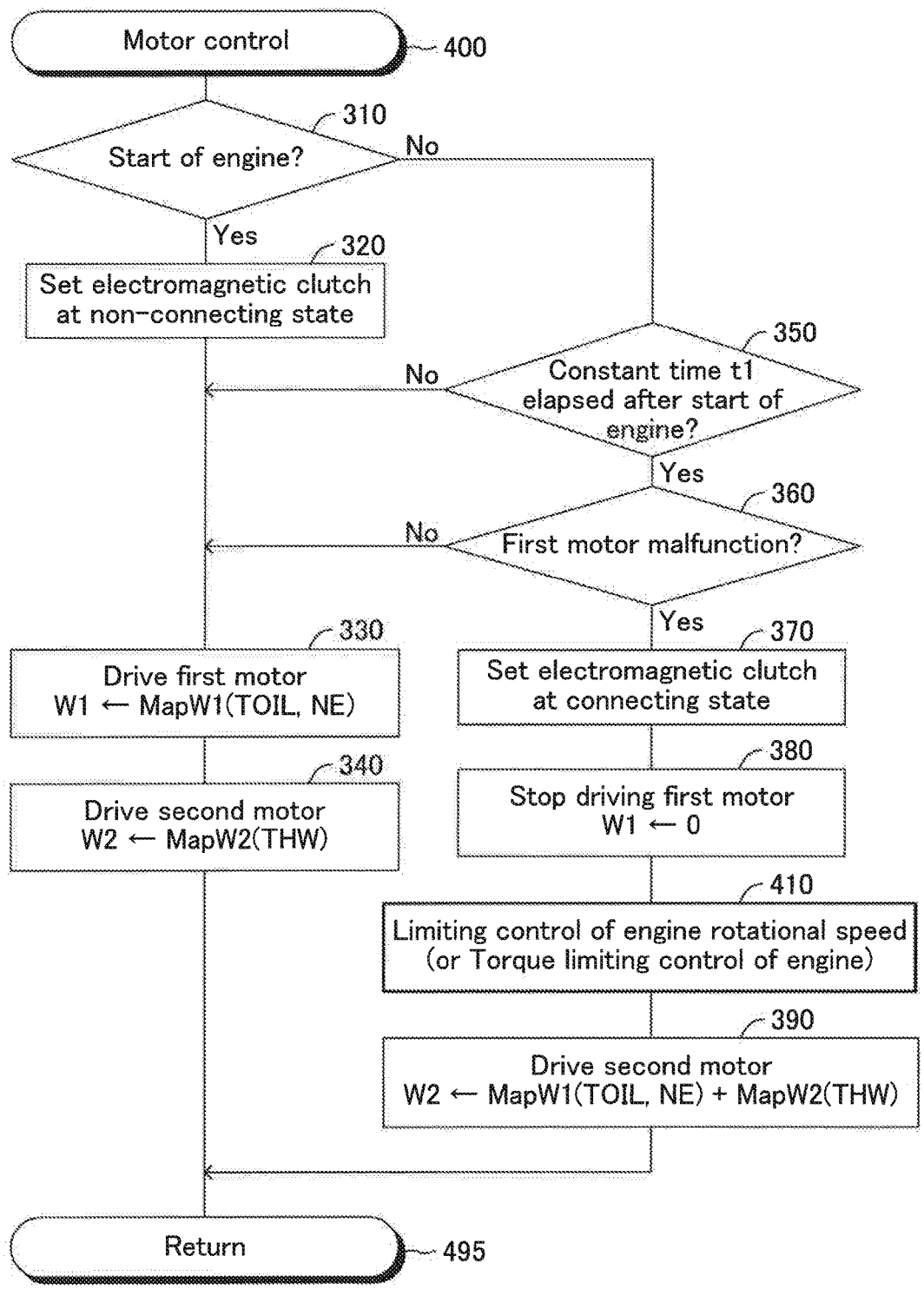
FIG. 4 is a flowchart showing a routine executed by a CPU of a modification of the first apparatus.

A CPU of a modified embodiment executes a "motor control routine" shown by a flowchart in FIG. 4 in place of FIG. 3 every elapse of a predetermined time period. The routine shown in FIG. 4 is different from the routine shown in FIG. 3 only in that step 410 is inserted between step 380 and step 390.

Therefore, if the CPU determines that the first motor 22 malfunctions, it proceeds to step 410 after performing the process of step 380. At step 410, the CPU executes processes to perform a limiting control of the engine rotational speed (hereinafter, simply referred to as a "speed limiting control"). The speed limiting control is to control the operation of the engine 10 in such a manner that the engine rotational speed NE does not exceed (becomes larger than) a limit speed NEup. Specifically, if the engine rotational speed NE is higher than the limit speed NEup, the CPU send an instruction to the engine driving actuator 54 to lower/decrease the output torque of the engine 10. For example, the CPU sends the signal to the throttle valve actuator serving as the engine driving actuator 54. Alternatively, the CPU send the signal to the ignition device serving as the engine driving actuator 54 to retard an ignition timing. By means of those, the output torque of the engine 10 is decreased, and thus, the engine rotational speed NE is adjusted to become equal to or lower than the limit speed NEup.

Consequently, the first motor target output power W1 determined based on the table MapW1(TOIL, NE) is limited so as to be equal to or smaller than the first motor target output power W1=MapW1(TOILmax, NEup) determined when the engine rotational speed NE is equal to the predetermined limit speed NEup and the oil temperature TOIL is equal to a predetermined oil temperature (e.g., the maximum oil temperature TOILmax). As a result, the target output power W2 of the second motor 23 determined at step 390 (that is a sum of the output power determined by the MapW1(TOILmax, NE) and the output power determined by the MapW2(THW)) becomes smaller than the output power determined when the engine rotational speed NE is equal to or higher than the limit speed NEup. In other words, the engine 10 is operated in such a manner that the target output power W2 of the second motor 23 obtained at step 390 is equal to or smaller than the maximum output power which the second motor 23 can generate. Accordingly, a motor whose maximum power is relatively small can be adopted/used as the second motor 23, leading to cost reduction of the apparatus. In addition, the possibility that the sliding portions of the engine 10 seize can be further decreased, since an amount of the lubrication oil supplied to the engine 10 and an amount of the coolant supplied to the engine 10 do not become insufficient.

It should be noted that, at step 410, the CPU of the modified embodiment may perform a torque limiting control to limit the torque generated by the engine 10 in such a manner that the torque generated by the engine 10 becomes equal to or smaller than a limit torque, in place of or in addition to the speed limiting control. According to the torque limiting control, signals are sent to the throttle valve actuator serving as the engine driving actuator 54 so that the engine generating torque estimated based on the engine rotational speed NE and the throttle valve opening becomes equal to or smaller than the limit torque, and as a result, for example, the throttle valve opening is decreased. In this example as well, the engine rotational speed NE does not after all reach the maximum rotational speed NEmax, and therefore, the first motor target output power W1 can be lowered. Accordingly, the target output power W2 of the second motor 23 obtained at step 390 becomes smaller. In other words, the engine 10 is operated in such a manner that the target output power W2 of the second motor 23 obtained at step 390 is equal to or smaller than the maximum output power which the second motor 23 can generate. As a result, a motor whose maximum power is relatively small can be adopted/used as the second motor 23, leading to cost reduction of the apparatus. In addition, the possibility that the sliding portions of the engine 10 seize can be further decreased, since an amount of the lubrication oil supplied to the engine 10 and an amount of the coolant supplied to the engine 10 do not become insufficient.

Second Embodiment

Figure 5:
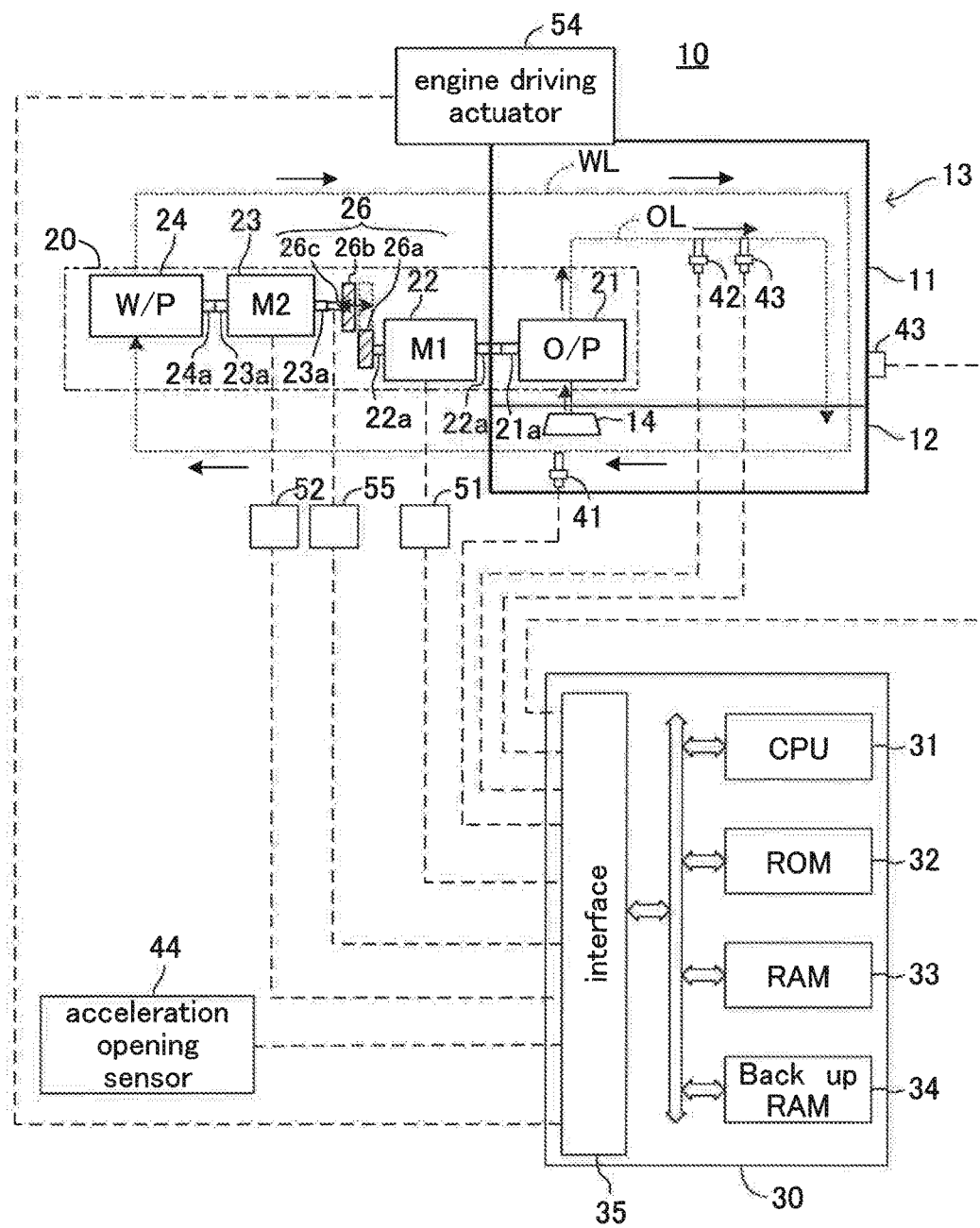
FIG. 5 is a schematic diagram of an internal combustion engine to which a control apparatus (second apparatus) for an internal combustion engine according to a second embodiment of the present invention is applied.

The control apparatus for an internal combustion engine (hereinafter, simply referred to as a "second apparatus") according to a second embodiment of the present invention is different from the first apparatus in that, as shown in FIG. 5, the pump device 20 of the second apparatus comprises a gear mechanism (first gear mechanism) 26 in place of the clutch mechanism 25, and the output shaft 23a is parallel with the output shaft 22a, and is positioned along/on an axis different from an axis of the output shaft 22a.

Hereinafter, a reference number given to, e.g., a part or structure of the first apparatus, also applies to the similar part or structure of the second apparatus. A detailed explanation for those parts etc. will be omitted.

As described above, the second motor 23 is positioned/arranged in such a manner that the output shaft 23a is parallel with the output shaft 22a of the first motor 22, but the axis of the output shaft 23a is different from the axis of the output shaft 22a of the first motor 22.

The gear mechanism (first gear mechanism) 26 is positioned between the other end (left hand end in FIG. 5) of the output shaft 22a of the first motor 22 and the other end (right hand end in FIG. 5) of the output shaft 23a of the second motor 23. The gear mechanism 26 comprises a first gear 26a, a second gear 26b, an elongate-and-contract shaft 26c, and an unillustrated actuator.

The first gear 26a is fixed to the other end (left side end in FIG. 5) of the output shaft 22a of the first motor 22 so as to be coaxial with the second output shaft 22a.

The second gear 26b is fixed to one end (right side end in FIG. 5) of the elongate-and-contract shaft 26c so as to be coaxial with the elongate-and-contract shaft 26c.

The elongate-and-contract shaft 26c spline fits with (is spline connected with) the output shaft 23a of the second motor 23 so that the shaft 26c can elongate and shorten (go backward and forward with respect to the output shaft 23a) in the axis direction of the output shaft 23a, and can rotate integrally with the output shaft 23a.

The actuator is, for example, a hydraulic cylinder. The actuator elongates and shortens in response to a signal from a mechanism driving circuit 55, to thereby elongate and shorten the elongate-and-contract shaft 26c.

If the elongate-and-contract shaft 26c elongates toward the output shaft 22a (main body of the first motor 22), the second gear 26b directly meshes with the first gear 26a. As a result, the rotating torque (driving force) generated at the output shaft 23a of the second motor 23 is transmitted to the output shaft 22a of the first motor 22 so that the power-transmitting state is achieved (refer to a broken line shown in FIG. 5). As this power-transmitting state is realized/achieved, the second state is realized/achieved in which the second motor 23 can rotate/drive the oil pump 21 through the output shaft 22a.

In contrast, if the elongate-and-contract shaft 26c shortens toward the output shaft 23a (main body of the second motor 23), the second gear 26b does neither directly nor indirectly mesh with the first gear 26a. As a result, the rotating torque (driving force) generated at the output shaft 23a of the second motor 23 is not transmitted to the output shaft 22a of the first motor 22 so that the non-power-transmitting state is achieved. As this non-power-transmitting state is realized/achieved, the first state is realized/achieved in which the second motor 23 cannot rotate/drive the oil pump 21.

The number of teeth of the first gear 26a is smaller than the number of teeth of the second gear 26b. It should be noted that the number of teeth of the first gear 26a may be equal to or larger than the number of teeth of the second gear 26b.

As described above, the second change over (switch over) mechanism 26 is a gear mechanism 26, which realizes a state in which the "first gear 26a which rotates integrally with the output shaft 22a of the first motor 22" does not mesh with the second gear 26b which rotates integrally with the output shaft 23a of the second motor 23" (irrespective of whether directly or not), so as to achieve the first state (non-power transmitting state, non-meshed state), and which realizes a state in which the first gear 26a mesh with the second gear 26b, either directly or indirectly, so as to achieve the second state (power transmitting state, meshed state).

According to the second apparatus, the second motor 23 can drive the oil pump 21 when the first motor 22 malfunctions. Thereby, the lubrication oil can be fed to the oil path OL even if the first motor 22 malfunctions. As a result, the possibility that the sliding portions of the engine 10 seize can be reduced. Further, the oil pump 21 is driven by either one of the first motor 22 and the second motor 23 (without using the crank shaft), and thus, the friction in the engine 10 can be reduced.

Further, the change over (switch over) mechanism 26 is configured in such a manner that the number of teeth of the first gear 26a is smaller than the number of teeth of the second gear 26b. As a result, the ouput torque of the second motor 23 is increased when it is transmitted to the rotating shaft 21a of the oil pump 21, and thus, the a motor whose maximum power is relatively small can be adopted/used as the second motor 23. It should be noted that the number of teeth of the first gear 26a may be larger than the number of teeth of the second gear 26b, depending upon a torque and/or a power required for the second motor 23 to drive the oil pump 21, as well as depending upon a rating of the second motor 23. In such an example, the oil pump 21 can be rotated at a high speed, and thereby, a sufficient amount of the lubrication oil can be supplied to the engine 10.

Further, the change over (switch over) mechanism 26 according to the second apparatus may be configured in such a manner that a third gear which always meshes with the first gear 26a is provided between the first gear 26a and the second gear 26b, the second gear 26b meshes with the third gear so that the second gear 26b indirectly meshes with the first gear 26a, as the elongate-and-contract shaft 26c is elongated toward the output shaft 22a (main body of the motor 22). Furthermore, a single or a plurality of intervening gears always meshing with the third gear may be provided in addition to the third gear, and thereby the second gear 26b may mesh with one of the intervening gears as the elongate-and-contract shaft 26c is elongated toward the output shaft 22a (main body of the motor 22).

Third Embodiment

Figure 6:
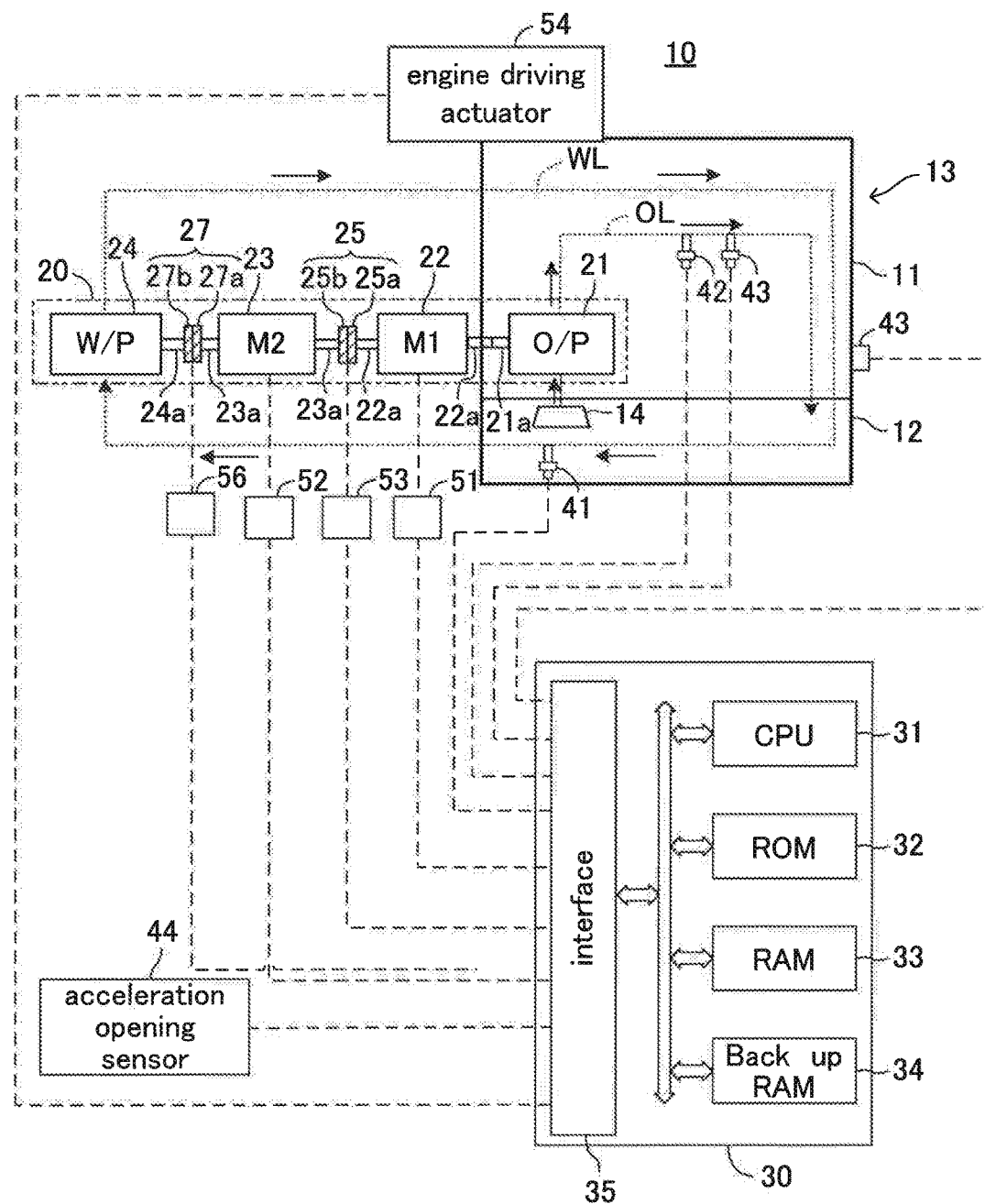
FIG. 6 is a schematic diagram of an internal combustion engine to which a control apparatus (third apparatus) for an internal combustion engine according to a third embodiment of the present invention is applied.

The control apparatus for an internal combustion engine (hereinafter, simply referred to as a "third apparatus") according to a third embodiment of the present invention is different from the first apparatus in that, as shown in FIG. 6, the third apparatus is applied to the internal combustion engine including the pump device 20 which comprises a second electromagnetic clutch 27.

The second electromagnetic clutch 27 is positioned/placed between the rotating shaft 24a of the water pump 24 and the output shaft 23a of the second motor 23. If it is determined that the first motor 22 malfunctions, the third apparatus sets the first electromagnetic clutch 25 at the connecting state so as to have the second motor 23 drive the oil pump 21, and sets the second electromagnetic clutch 27 at the non-connecting state so that the the second motor 23 does not drive the water pump 24.

More specifically, the second electromagnetic clutch 27 is positioned between one end (left hand end in FIG. 6) of the output shaft 23a of the second motor 23 and one end (right hand end in FIG. 6) of the rotating shaft 24a of the water pump 24. The second electromagnetic clutch 27 comprises a third friction plate 27a connected to the output shaft 23a, a fourth friction plate 27b connected to the rotating shaft 24a, and an unillustrated electromagnetic actuator.

The second electromagnetic clutch 27 can transfer a rotating torque (driving force) generated at the output shaft 23a of the second motor 23 to the rotating shaft 24a of the water pump 24, if the third friction plate 27a and the fourth friction plate 27b are engaged with each other (that is, if the second electromagnetic clutch 27 functions/operates or in the connecting state). This state is referred to as a "power-transmitting state", or as a "third state", as a matter of convenience. Further, the second electromagnetic clutch 27 cannot transfer the rotating torque (driving force) generated at the output shaft 23a of the second motor 23 to the rotating shaft 24a of the water pump 24, if the third friction plate 27a and the fourth friction plate 27b are apart from (or not engaged with) each other (that is, if the second electromagnetic clutch 27 does not function/operate or in the non-connecting state). This state is referred to as a "non-power-transmitting state", or as a "fourth state", as a matter of convenience. An unillustrated electromagnetic actuator is operated in response to a control signal from the second clutch driving circuit 56 so as to have the second electromagnetic clutch 27 changes between the power-transmitting state and the non-power-transmitting state. That is, the second electromagnetic clutch 27 is configured so as to be able to selectively realize either one of the power-transmitting state and the non-power-transmitting state.

(Outline of Switch Over Control According to the Third Apparatus)

The outline of the switch over control that the third apparatus performs will next be described. Similarly to the first apparatus, if it is not determined that the first motor 22 malfunctions, the third apparatus drives the oil pump 21 using the first motor 22, and drives the water pump 24 using the second motor. The third apparatus, if it is determined that the first motor 22 malfunctions (i.e., if it is determined that the malfunction of the first motor 22 has occurred), drives the oil pump 21 using the second motor 23, but does not drive the water pump 24 using the second motor 23.

More specifically, the third apparatus changes the state of the electromagnetic clutch 25 which has been in the non-connecting state into the connecting state so as to connect the output shaft 22a of the first motor 22 with the output shaft 23a of the second motor 23. In addition, the third apparatus changes the state of the electromagnetic clutch 27 which has been in the connecting state into the non-connecting state so as to disconnect the rotating shaft 24a of the water pump 24 from the output shaft 23a of the second motor 23. Consequently, the second motor 23 and the oil pump 21 are in the power transmitting state through the output shaft 22a of the first motor 22, and the second motor 23 and the water pump 24 are in the non-power-transmitting state. Further, the third apparatus stops energization of the first motor 22 (stops supplying the power with the first motor 22), and drives the second motor 23 only, similarly to the first apparatus.

(Actual Operation of the Third Apparatus)

The actual operation of the third apparatus will next be described. The CPU 31 (hereinafter, simply referred to as a "CPU") of the electric control unit 30 of the third apparatus executes a motor control routine shown by a flowchart in FIG. 7 every elapse of a predetermined time period after a start of the engine. It should be noted that the reference number given to the step whose process has been already described above is given to a step in FIG. 7 whose process is the same as the process already described above. The detailed description about such a step will be omitted.

At an appropriate point in time, the CPU starts processing from step 700 to proceed to step 310, at which it determines whether or not the present point in time is the time of the start of the engine 10. If the present point in time is the start of the engine 10, the CPU makes a "Yes" determination at step 310 to proceed to step 710, at which the CPU sets the first electromagnetic clutch 25 at the non-connecting state, and sets the second electromagnetic clutch 27 at the connecting state. Thereafter, the CPU executes the processes from step 330 to step 340 described above in this order to proceed to step 795 so as to end the present routine tentatively. Consequently, the oil pump 21 is driven by the first motor 22, and the water pump 24 is driven by the second motor 23.

Subsequently, as the CPU proceeds to step 310, it makes a "No" determination at step 310 to proceed to step 350. At this point in time, if the constant time t1 has not elapsed after the start of the engine 10, the CPU makes a "No" determination at step 350 to execute the processes of step 330 and step 340 described above.

If the CPU starts processing from step 700 after a point in time at which the constant time t1 has elapsed after the start of the engine 10, the CPU makes a "No" determination at step 310, and makes a "Yes" determination at step 350. Subsequently, the CPU proceeds to step 360 to determine whether or not the first motor 22 malfunctions.

If the CPU does not determine that the first motor 22 malfunctions, it makes a "No" determination at step 360 to execute the processes of step 330 and step 340 described above. Thereby, the oil pump 21 is driven by the first motor 22, and the water pump 24 is driven by the second motor 23.

In contrast, if the CPU determines that the first motor 22 is malfunctioning, it makes a "Yes" determination at step 360 to execute processes of step 370, step 380, step 720, and step 730 in this order, and proceeds to step 795 to end the present routine tentatively.

Step 370: The CPU sets the electromagnetic clutch 25 at the connecting state. That is, the CPU sends an instruction signal to the clutch driving circuit 53 so as to change/switch over the state of the electromagnetic clutch 25 from the "non-connecting state that is the non-power-transmitting state" to the "connecting state that is the power-transmitting state."

Step 380: The CPU sets the target output power W1 of the first motor 22 at "0" so as to stop driving the first motor 22.

Step 720: The CPU sets the second electromagnetic clutch 27 at the non-connecting state. That is, the CPU sends an instruction signal to the second clutch driving circuit 56 so as to change/switch over the state of the second electromagnetic clutch 27 from the "connecting state that is the power-transmitting state" to the "non-connecting state that is the non-power-transmitting state."

Step 730: The CPU determines a second motor target output power W2 by applying the actual oil temperature TOIL and the actual engine rotational speed NE to a look up table MapW2(TOIL, NE) stored in the ROM 32. Thereafter, the CPU controls the second motor 23 (the second driving circuit 52) in such a manner that the second motor 23 generates an output power equal to the second motor target output power W2. According to the table MapW2(TOIL, NE), the second motor target output power W2 is determined to become larger as the oil temperature TOIL becomes higher, and to become larger as the engine rotational speed NE becomes higher. It should be noted that the table MapW2(TOIL, NE) may be the same as the table MapW1 (TOIL, NE), or may be different from the table MapW1 (TOIL, NE).

As described above, the internal combustion engine 10 to which the third apparatus is applied comprises the second change over mechanism 27 whose state changes between the third state and the fourth state, the third state being a state (power-transmitting state, connecting state) in which the second motor 23 can drive the water pump 24, and the fourth state being a state (non-power-transmitting state, non-connecting state) in which the second motor 23 cannot drive the water pump 24.

Further, the third apparatus comprises control means (30) which is configured to realize the third state using the second change over mechanism 27 if it is not determined that the first motor malfunctions (refer to step 710), and is configured to realize the fourth state using the second change over mechanism 27 if it is determined that the first motor malfunctions (refer to step 360 and step 720).

Furthermore, the second change over mechanism 27 is the second clutch mechanism 27, which connects the output shaft 23a of the second motor 23 with the rotating shaft 24a of the water pump 24 in such a manner that power can be transmitted therebetween so as to realize the third state, and which disconnects the output shaft 23a of the second motor 23 from the rotating shaft 24a of the water pump 24 in such a manner that no power can be transmitted therebetween so as to realize the fourth state.

According to this configuration, if the oil pump 21 is driven by the second motor 23, the second motor 23 does not drive the water pump 24. Therefore, as compared to an example in which the second motor 23 drives both the oil pump 21 and the water pump 24, it is possible to lower the output power of the second motor 23. As a result, a motor whose maximum power is relatively low can be adopted/used as the second motor 23, and thus, the cost for the apparatus can be reduced. In addition, the possibility that the sliding portions of the engine 10 seize can be decreased, since an amount of the lubrication oil supplied to the engine 10 does not become insufficient.

Modified Embodiment of the Third Embodiment

Figure 7:
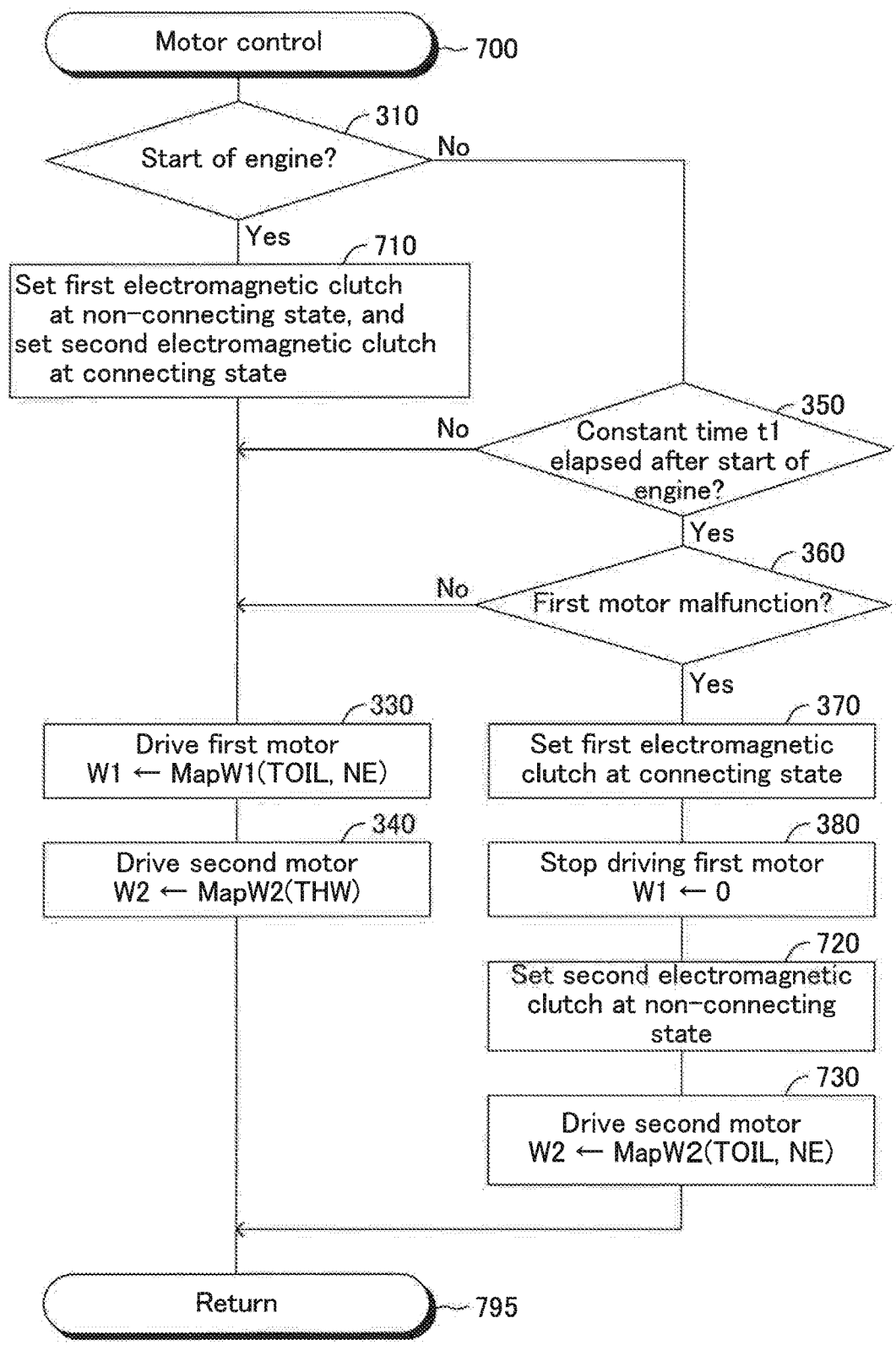
FIG. 7 is a flowchart showing a routine executed by a CPU of the third apparatus.
Figure 8:
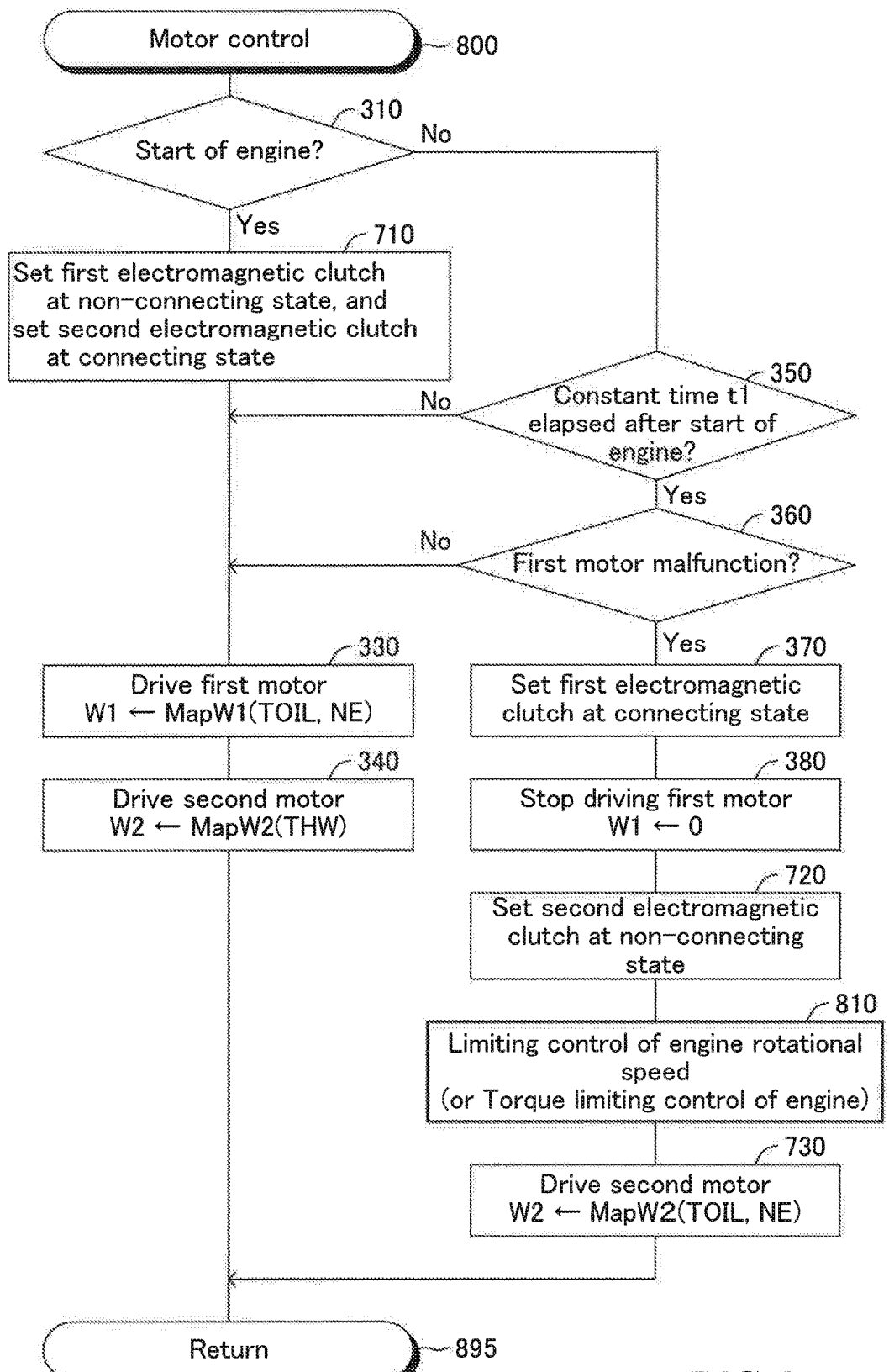
FIG. 8 is a flowchart showing a routine executed by a CPU of a modification of the third apparatus.

A CPU of a modified embodiment executes a "motor control routine" shown by a flowchart in FIG. 8 in place of FIG. 7 every elapse of a predetermined time period. The routine shown in FIG. 8 is different from the routine shown in FIG. 7 only in that step 810 is inserted between step 720 and step 730. The step 810 is a step whose process to be executed is the same as the process of step 410.

Therefore, if the CPU determines that the first motor 22 malfunctions, it proceeds to step 810, at which the CPU executes the processes to perform the limiting control of the engine rotational speed (speed limiting control). Accordingly, the engine rotational speed NE is adjusted to become equal to or lower than the limit speed NEup.

Consequently, as shown in FIG. 2, the target oil pressure Ptgt becomes equal to or lower than a limit oil pressure Pup, and thus, the second motor target output power W2 determined based on the table MapW2(TOIL, NE) is limited so as to be equal to or smaller than a value (=MapW2(TOILmax, NEup) which is smaller than the second motor target output power W2=MapW2(TOILmax, NEmax) determined as the engine rotational speed NE is equal to the maximum speed NEmax and the oil temperature TOIL is equal to the maximum oil temperature TOILmax. As a result, the target output power W2 of the second motor 23 determined at step 730 becomes small. In other words, the engine 10 is operated in such a manner that the target output power W2 of the second motor 23 determined at step 730 is limited to be equal to or smaller than the maximus output power that the second motor 23 can generate. Accordingly, a motor whose maximum power is relatively small can be adopted/used as the second motor 23, leading to cost reduction of the apparatus. In addition, the possibility that the sliding portions of the engine 10 seize can be decreased, since an amount of the lubrication oil supplied to the engine 10 does not become insufficient.

It should be noted that, at step 810, the CPU of this modified embodiment may perform the torque limiting control to limit the torque generated by the engine 10 in such a manner that the torque generated by the engine 10 becomes equal to or smaller than the limit torque, in place of or in addition to the speed limiting control. In this example as well, the engine rotational speed NE does not eventually reach the maximum rotational speed NEmax, and therefore, the target output power W2 of the second motor 23 can be made smaller. As a result, a motor whose maximum power is relatively small can be adopted/used as the second motor 23, leading to cost reduction of the apparatus. In addition, the possibility that the sliding portions of the engine 10 seize can be decreased, since an amount of the lubrication oil supplied to the engine 10 does not become insufficient.

Fourth Embodiment

Figure 9:
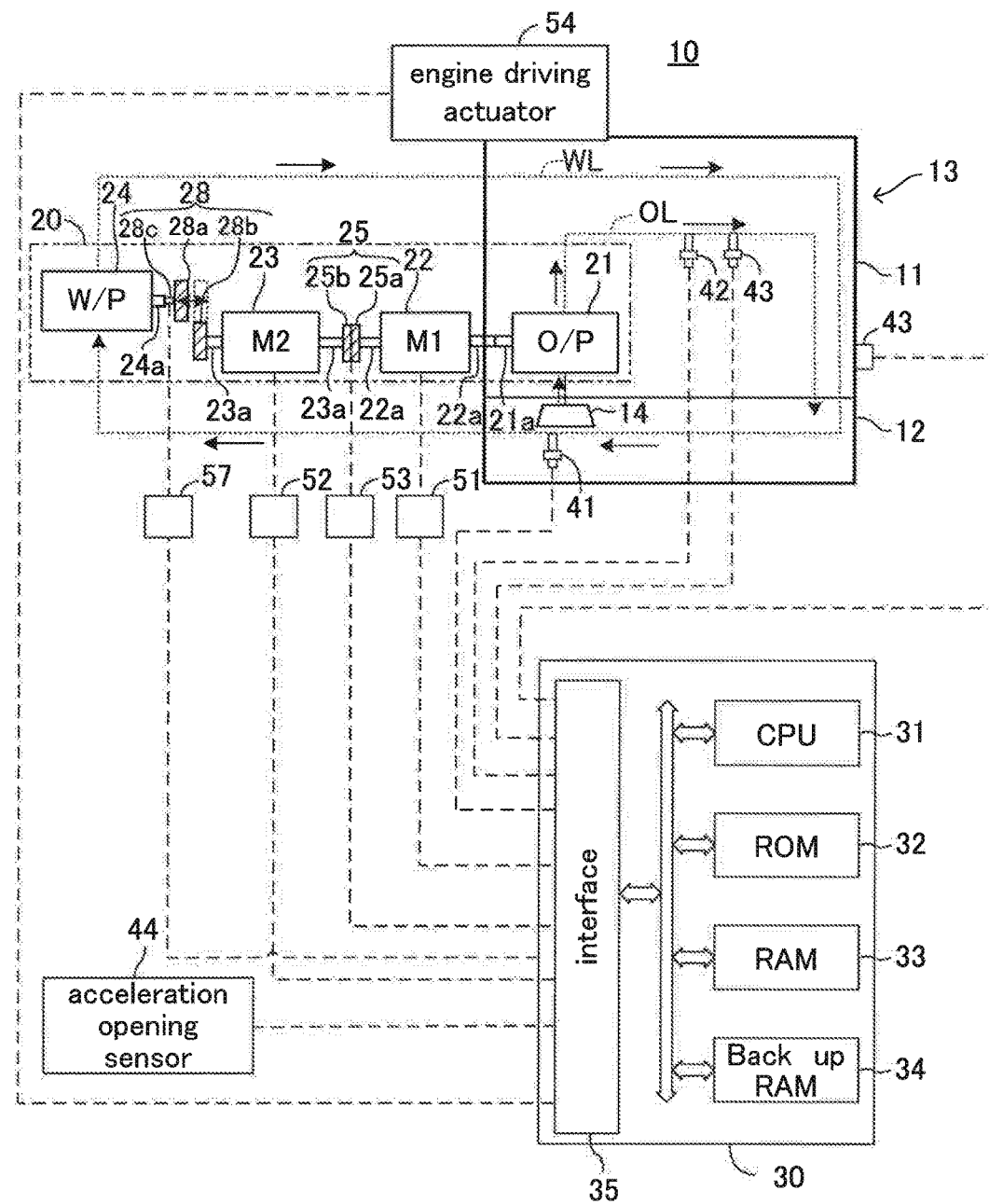
FIG. 9 is a schematic diagram of an internal combustion engine to which a control apparatus (fourth apparatus) for an internal combustion engine according to a fourth embodiment of the present invention is applied.

The control apparatus for an internal combustion engine (hereinafter, simply referred to as a "fourth apparatus") according to a fourth embodiment of the present invention is different from the third apparatus in that, as shown in FIG. 9, the pump device 20 of the fourth apparatus comprises a second gear mechanism 28 in place of the second clutch mechanism 27 of the third apparatus, and the output shaft 23a is parallel with the rotating shaft 24a, and is positioned along/on an axis different from an axis of the rotating shaft 24a.

Hereinafter, a reference number given to, e.g., a part or structure of the third apparatus, also applies to the similar part or structure of the fourth apparatus. A detailed explanation for those parts etc. will be omitted.

As described above, the water pump 24 is positioned in such a manner that the rotating shaft 24a is parallel with the output shaft 23a of the second motor 23, and the axis of the rotating shaft 24a is different from the axis of the output shaft 23a.

The second gear mechanism 28 is positioned between one end (right hand end in FIG. 9) of the rotating shaft 24a of the water pump 24 and the one end (left hand end in FIG. 9) of the output shaft 23a of the second motor 23. The second gear mechanism 28 comprises a third gear 28a, a fourth gear 28b, an elongate-and-contract shaft 28c, and an unillustrated actuator.

The third gear 28a is fixed to one end (right side end in FIG. 9) of the elongate-and-contract shaft 28c so as to be coaxial with the elongate-and-contract shaft 28c.

The fourth gear 28b is fixed to one end (left side end in FIG. 9) of the output shaft 23a of the second motor 23 so as to be coaxial with the output shaft 23a.

The elongate-and-contract shaft 28c spline fits with (is spline connected with) the rotating shaft 24a of the water pump 24 so that the shaft 28c can elongate and shorten (go backward and forward with respect to the rotating shaft 24a)

in the axis direction of the rotating shaft 24*a*, and can rotate integrally with the rotating shaft 24*a*.

The actuator is, for example, a hydraulic cylinder. The actuator elongates and shortens in response to a signal from a mechanism driving circuit 57, to thereby elongate and shorten the elongate-and-contract shaft 28*c*.

If the elongate-and-contract shaft 28*c* elongates toward the output shaft 23*a* (main body of the second motor 23), the third gear 28*a* directly meshes with the fourth gear 28*b*. As a result, the rotating torque (driving force) generated at the output shaft 23*a* of the second motor 23 is transmitted to the rotating shaft 24*a* of the water pump 24 so that the power-transmitting state is achieved (refer to a broken line shown in FIG. 9). As this power-transmitting state is realized/achieved, the third state is realized/achieved in which the second motor 23 can rotate/drive the water pump 24.

In contrast, if the elongate-and-contract shaft 28*c* shortens toward the rotating shaft 24*a* (main body of the water pump 24), the third gear 28*a* neither directly nor indirectly mesh with the fourth gear 28*b*. As a result, the rotating torque (driving force) generated at the output shaft 23*a* of the second motor 23 is not transmitted to the rotating shaft 24*a* of the water pump 24 so that the non-power-transmitting state is achieved. As this non-power-transmitting state is realized/achieved, the fourth state is realized/achieved in which the second motor 23 cannot rotate/drive the water pump 24.

As described above, the second change over mechanism 28 of the fourth apparatus is the gear mechanism 28, which achieves a state in which the "third gear 28*a* which rotates integrally with the rotating shaft 24*a* of the water pump 24" and the "fourth gear 28*b* which rotates integrally with the output shaft 23*a* of the second motor 23, either directly or indirectly, mesh with each other, so as to realize the third state (power transmitting state, meshed state), and which achieves a state in which the third gear and the fourth gear neither directly nor indirectly mesh with each other, so as to realize the fourth state (non-power transmitting state, non-meshed state).

According to the fourth apparatus, when the oil pump 21 is driven by the second motor 23, the second motor 23 does not drive the water pump 24. Thus, the output power of the second motor 23 can be made smaller as compared to an example in which both of the oil pump 21 and the water pump 24 are driven by the second motor 23. As a result, a motor whose maximum power is relatively small can be adopted/used as the second motor 23, leading to cost reduction of the apparatus. In addition, the possibility that the sliding portions of the engine 10 seize can be decreased, since an amount of the lubrication oil supplied to the engine 10 does not become insufficient.

It should be noted that the number of teeth of the third gear 28*a* may be equal to or smaller than the number of teeth of the fourth gear 28*b*.

As described above, each of the control apparatuses of the embodiments and the modified embodiments according to the present invention drives the oil pump 21 with the second motor 23, if the first motor 22 malfunctions. Therefore, the oil pump 21 can be driven to supply the lubrication oil with the oil path without using the rotation of the crank shaft as the driving source, when the first motor 22 malfunctions. As a result, the possibility that the sliding portions of the engine 10 seize can be reduced, and the friction in the engine 10 can be reduced.

It should be noted that embodiments of the present invention should not be limited to the embodiments described above, but may include various modifications. For example, in the second apparatus shown in FIG. 5, the elongate-and-contract shaft 26*c* may be provided to the output shaft 22*a* of the first motor 22. Further, in the third apparatus shown in FIG. 6, the first gear mechanism 26 of the second apparatus may be adopted in place of the first electromagnetic clutch 25. Similarly, in the fourth apparatus shown in FIG. 9, the first gear mechanism 26 of the second apparatus may be adopted in place of the first electromagnetic clutch 25. Further, for example, the rotating shaft of the oil pump 21 may penetrate through the main body of the oil pump 21, the first motor 22 may be positioned at one side of the rotating shaft via the above described electromagnetic clutch or the above described gear mechanism, and the second motor 23 may be positioned at the other side of the rotating shaft via the above described electromagnetic clutch or the above described gear mechanism.

What is claimed is:

1. A control apparatus of an internal combustion engine in which lubrication is performed using a lubrication oil discharged from an oil pump, and cooling is performed using a coolant discharged from a water pump, wherein said internal combustion engine comprises,
   a first electric motor for driving said oil pump;
   a second electric motor for driving said water pump; and
   a first change over mechanism configured to change state between a first state and a second state, said first state being a state in which said second electric motor cannot drive said oil pump, and said second state being a state in which said second electric motor can drive said oil pump; and
   a second change over mechanism configured to change state between a third state and a fourth state, said third state being a state in which said second electric motor can drive said water pump, and said fourth state being a state in which said second electric motor cannot drive said water pump, wherein,
   said control apparatus comprises an electric control unit comprising a CPU, a ROM, a RAM, and an interface, the electric control unit configured to:
   determine whether or not said first electric motor malfunctions; and
   realize said first state using said first change over mechanism when it is not determined that said first electric motor malfunctions, realize said second state using said first change over mechanism when it is determined that said first electric motor malfunctions, realize said third state using said second change over mechanism when it is not determined that said first electric motor malfunctions, and realize said fourth state using said second change over mechanism when it is determined that said first electric motor malfunctions.

2. The control apparatus of an internal combustion engine according to claim 1, wherein,
   said electric control unit is configured to perform at least one of a torque limiting control to limit a torque generated by said internal combustion engine to a threshold torque or smaller and a speed limiting control to limit an engine rotational speed of said internal combustion engine to a threshold rotational speed or lower, when it is determined that said first electric motor malfunctions.

3. The control apparatus of an internal combustion engine according to claim 1, wherein,
   said first change over mechanism is a first clutch mechanism, which disconnects a rotating shaft of said oil pump from an output shaft of said second electric motor in such a manner that no power can be transmitted therebetween so as to realize said first state, and connects said rotating shaft of said oil pump with said output shaft of said second electric motor in such a manner that power can be transmitted therebetween so as to realize said second state.

4. The control apparatus of an internal combustion engine according to claim 1, wherein,
said first change over mechanism is a first gear mechanism, which achieves a state in which a first gear which rotates integrally with an output shaft of said first electric motor and a second gear which rotates integrally with an output shaft of said second electric motor neither directly nor indirectly mesh with each other, so as to realize said first state, and which achieves a state in which said first gear and said second gear directly or indirectly mesh with each other, so as to realize said second state.

5. The control apparatus of an internal combustion engine according to claim 4, wherein, the number of teeth of said first gear and the number of teeth of said second gear are different from each other.

6. The control apparatus of an internal combustion engine according to claim 1, wherein,
said electric control unit is configured to have an output power of said second electric motor become larger than an output power required for said second electric motor to drive said water pump, if it is determined that said first electric motor malfunctions.

7. The control apparatus of an internal combustion engine according to claim 1, wherein,
said second change over mechanism is a second clutch mechanism, which connects an output shaft of said second electric motor with a rotating shaft of said water pump in such a manner that power can be transmitted therebetween so as to realize said third state, and which disconnects said output shaft of said second electric motor from said rotating shaft of said water pump in such a manner that no power can be transmitted therebetween so as to realize said fourth state.

8. The control apparatus of an internal combustion engine according to claim 1, wherein,
said second change over mechanism is a second gear mechanism, which achieves a state in which a third gear which rotates integrally with said rotating shaft of said water pump and a fourth gear which rotates integrally with said output shaft of said second electric motor directly or indirectly mesh with each other, so as to realize said third state, and which achieves a state in which said third gear and said fourth gear neither directly nor indirectly mesh with each other, so as to realize said fourth state.

* * * * *